(12) United States Patent
Yoshikawa

(10) Patent No.: US 6,605,916 B1
(45) Date of Patent: *Aug. 12, 2003

(54) ROTATION POSITION CONTROL APPARATUS OF ROTARY ELEMENT OF FILTER

(75) Inventor: Kazumasa Yoshikawa, Utsunomiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/544,310

(22) Filed: Apr. 6, 2000

(30) Foreign Application Priority Data

Apr. 12, 1999 (JP) ............................. 11-103985
Mar. 27, 2000 (JP) ........................... 2000-086188

(51) Int. Cl.$^7$ ............................. G05B 19/29; H01C 9/02
(52) U.S. Cl. ........................ 318/602; 318/661; 338/126
(58) Field of Search ................. 318/602, 661, 318/705, 603; 388/842; 359/369; 382/181; 338/162, 163, 184, 190–193, 197, 199

(56) References Cited

U.S. PATENT DOCUMENTS

| | | | | |
|---|---|---|---|---|
| 3,644,664 A | * | 2/1972 | Huboi et al. ................. | 358/516 |
| 3,801,198 A | * | 4/1974 | David .......................... | 355/32 |
| 3,876,967 A | * | 4/1975 | Hehl et al. .................... | 338/162 |
| 4,433,322 A | * | 2/1984 | Hirayama et al. ........... | 338/162 |
| 4,527,147 A | * | 7/1985 | Arakawa ...................... | 338/162 |
| 5,181,313 A | * | 1/1993 | Nonnenmacher et al. ..... | 29/620 |
| 6,281,657 B1 | * | 8/2001 | Matsuo ........................ | 318/705 |

FOREIGN PATENT DOCUMENTS

JP 2598699 8/1999

* cited by examiner

Primary Examiner—Khanh Dang
(74) Attorney, Agent, or Firm—Morgan & Finnegan, L.L.P.

(57) ABSTRACT

It is an object to perform a near rotating control of a rotary element. As a construction, disclosed is a rotating position control apparatus having a potentiometer constructed by a contact element rotating in accordance with the rotation of a rotary element and a resistive element on which the contact element slides, a control unit for driving the rotation of the rotary element to a plurality of rotating positions on the basis of an output of the potentiometer, and an insulator which is provided between both ends of the resistive element in the potentiometer and on which the contact element can slide, wherein the apparatus includes an A/D converting unit for A/D converting the output of the potentiometer and drives the rotation of the rotary element from the current rotating position to a target rotating position on the basis of a value obtained by A/D converting the output of the potentiometer through the A/D converting unit and a command code to instruct the rotating position of the rotary element.

16 Claims, 10 Drawing Sheets

ROTATION POSITION CONTROL APPARATUS OF ROTARY ELEMENT OF FILTER

BACKGROUND OF THE INVENTION

1. Field of the Invention

The present invention relates to an apparatus for performing a driving control of a rotary element to a plurality of rotating positions and, more particularly, to an apparatus for performing a driving control of a filter disk or the like which is used in a photographing system.

2. Related Background Art

In a photographing system for a color television, a filter disk having a plurality of conversion filters for color temperature, which is used upon photographing, is provided in many cases. The filter disk is rotated manually or by electrically driving to properly select the filter which is adapted for photographing conditions and the selected filter is attached to a photographing apparatus, so that the use proper for the photographing conditions is realized.

Among other photographing apparatuses, in a color photographing apparatus for broadcasting to which a high quality video image is especially required, the apparatus is constructed so as to have two filter disks in many cases in order to enable a fine correction to be realized.

As a filter disk apparatus provided for such a photographing apparatus, there is one as shown in FIG. 10. In FIG. 10, a rotatable filter disk 62 holds four temperature conversion filters 64a to 64d so that they are fitted to the disk. A motor 66 rotates the filter disk 62. A potentiometer 68 detects a rotating position of the filter disk 62. When the motor 66 rotates the filter disk 62, a rotation input unit of the potentiometer 68 rotates as much as the same rotation amount as that of the filter disk 62.

A command signal regarding a selection of a filter position is transmitted from an electric circuit of a television camera through a signal line 71. A change-over switch 72 selects any one of resistors VR1 to VR4 to be connected to one input terminal of a comparator 73 in accordance with the command signal transmitted via the signal line 71.

Each of the resistors VR1 to VR4 generates a voltage value having the same level as that of a voltage value that is outputted from the potentiometer 68 through a position signal calculation circuit 75 when each of the filters 64a to 64d is arranged on a photographing optical axis. A voltage signal from the position signal calculation circuit 75 is inputted to the other input terminal of the comparator 73.

Accordingly, when the filter disk 62 is driven to the filter position corresponding to the command signal, the comparator 73 compares the voltage value generated from the potentiometer 68 through the position signal calculation circuit 75 with the voltage value from any one of the resistors VR1 to VR4. A filter disk driving circuit 74 drives the motor 66 so that an output from the comparator 73 is equal to 0, thereby rotating the filter disk 62.

For instance, in a state where the filter 64a is arranged on the photographing optical axis, when the change-over switch 72 is switched to a connecting position with the resistor VR3 corresponding to the filter 64c in accordance with the command signal, an output corresponding to a difference between the voltage value (voltage value corresponding to the current filter position) outputted from the potentiometer 68 through the position signal calculation circuit 75 and the voltage value from the resistor VR3 is inputted to the filter disk driving circuit 74. The filter disk driving circuit 74 drives the motor 66 while there is a difference between those input voltage values and stops the motor driving at a time point when there is no difference between them.

In such an analog type filter position control using the potentiometer as mentioned above, however, since the voltage value (voltage value from each of the resistors VR1 to VR4) which is set in order to set each filter on the photographing optical axis is compared with the voltage value indicative of the current filter position from the potentiometer and the motor is controlled so as to equalize the two values, the filter disk cannot be rotated in a range other than an electric operating angle range of the potentiometer (namely, a slider, which rotates in an interlocking relation with the filter disk, can slide on a resistive element).

Therefore, in the above system, for example, in order to rotate the filter disk 62 from a rotating position to arrange the filter 64a on the photographing optical axis to a rotating position to arrange the filter 64d on the photographing optical axis, such a rotating path that the filter 64a is directly changed to one 64d (64a→64d) in which a rotation amount of the filter disk 62 is minimized cannot be used but the disk 62 has to be rotated so that the filter is subsequently changed to another one (64a→64b→64c→64d). That is, the system has such a drawback that it is impossible to perform a so-called near rotating control.

SUMMARY OF THE INVENTION

According to one aspect of this invention, there is provided a rotating position control apparatus having a potentiometer comprising a contact element rotating in accordance with the rotation of a rotary element and a resistive element on which the contact element slides, and a control unit for driving the rotation of the rotary element to a plurality of rotating positions on the basis of an output of the potentiometer, comprising: an insulator which is provided between both ends of the resistive element of the potentiometer and on which the contact element can slide; and a voltage setting circuit for setting a voltage of the insulator, wherein the control unit drives the rotation of the rotary element from the current rotating position to a target rotating position at a minimum rotation amount on the basis of the output of the potentiometer when the contact element slides on the resistive element and slides on the insulator.

Pursuant to another aspect of this invention, there is provided a rotating position control apparatus having a potentiometer comprising a contact element rotating in accordance with the rotation of a rotary element and a resistive element on which the contact element slides, and a control unit for driving the rotation of the rotary element to a plurality of rotating positions on the basis of an output of the potentiometer, comprising an A/D converting unit for A/D converting the output of the potentiometer, wherein the control unit determines a direction to rotate the rotary element from the current rotating position to a target rotating position at a minimum rotation amount by performing a logical calculation on the basis of a value obtained by A/D converting the output of the potentiometer through the A/D converting unit and a command code to instruct the rotating position of the rotary element.

According to still another aspect of this invention, there; is provided a rotating position control apparatus which has a potentiometer comprising a contact element rotating in accordance with the rotation of a rotary element and a resistive element on which the contact element slides, detects a position of the rotary element as an output of the potentiometer, compares the detected position with a target rotating position as a position to which the rotary element is moved, and moves the rotary element to at least three predetermined positions, comprising: an A/D converting unit for A/D converting the output of the potentiometer; a control unit for setting a predetermined control code to control the rotation of the rotary element every rotating area in which a difference obtained by comparing a value obtained by A/D converting a voltage value of the rotary element detected by the potentiometer with a value obtained by A/D converting a predetermined voltage value in the target rotating position lies within a predetermined range; and a control signal switching device for selecting a control signal to control the rotation of the rotary element on the basis of the control code, wherein the control unit controls a rotating speed and the rotating direction in which the rotation of the rotary element with a minimum rotation amount is obtained on the basis of the control code, determines that the rotary element reaches the target rotating position, and when the rotary element is rotated on the basis of the control code, controls the rotating speed of the rotary element so as to be slower as the position of the rotary element is closer to the target rotating position.

In accordance with still another aspect of this invention, there is provided a rotating position control apparatus which has a potentiometer comprising a contact element rotating in accordance with the rotation of a rotary element and a resistive element on which the contact element slides, detects a position of the rotary element as an output of the potentiometer, compares the detected position with a target rotating position as a position to which the rotary element is moved, and moves the rotary element to at least three predetermined positions, comprising: an A/D converting unit for A/D converting the output of the potentiometer;:and a control unit for allowing the A/D converting unit to A/D convert a detection value of the rotary element detected by the potentiometer to set the resultant value to a position table code and setting the target rotating position of the rotary element as a command table code, wherein the control unit drives the rotation of the rotary element in the predetermined rotating direction in which the rotation amount is minimized on the basis of the combination of values of the position table code and the command table code.

DETAILED DESCRIPTION OF THE PREFERRED EMBODIMENTS

First Embodiment

Figure 8:
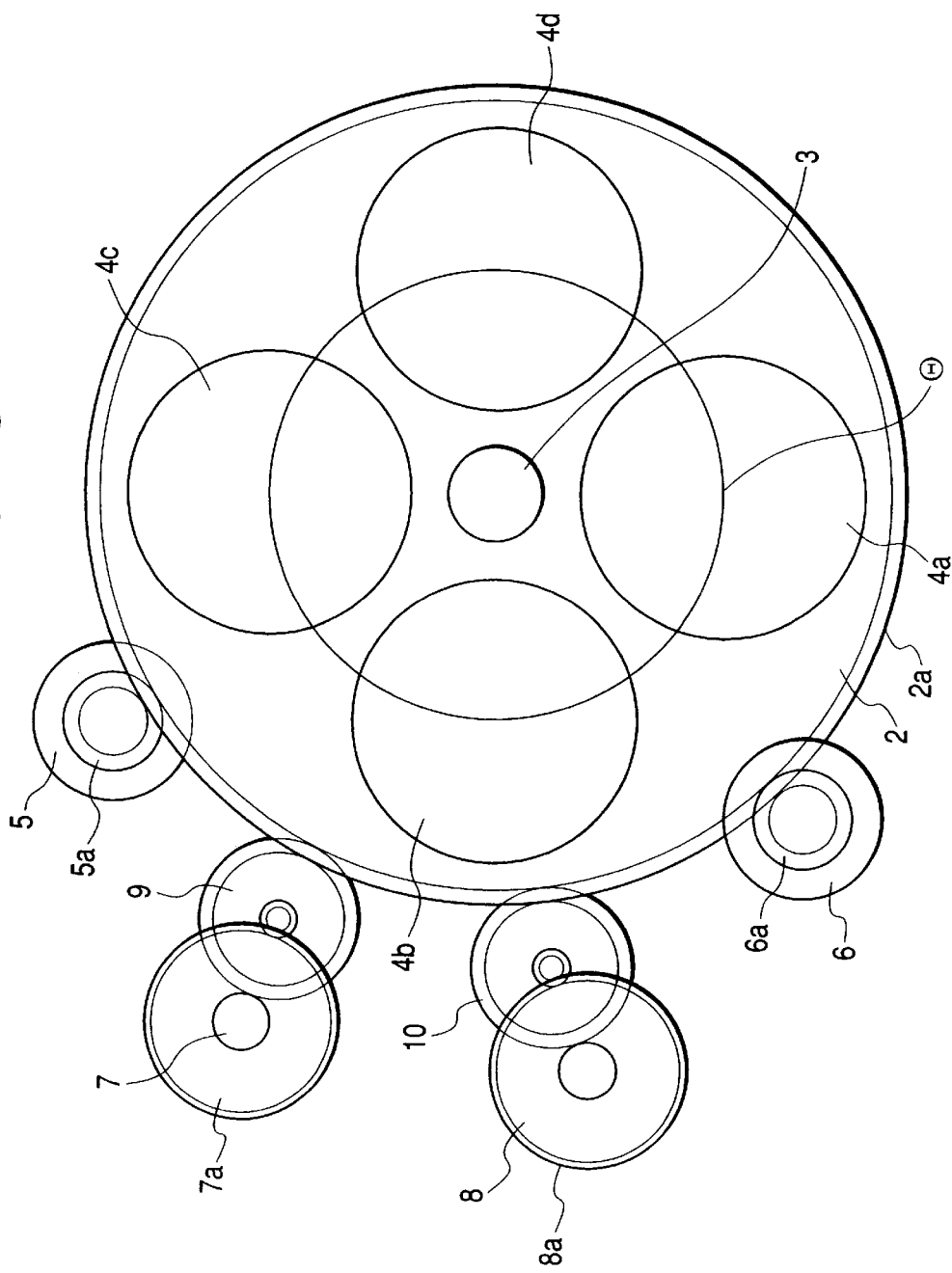
FIG. 8 is a front view showing a mechanical construction of the filter disk apparatus.
Figure 9:
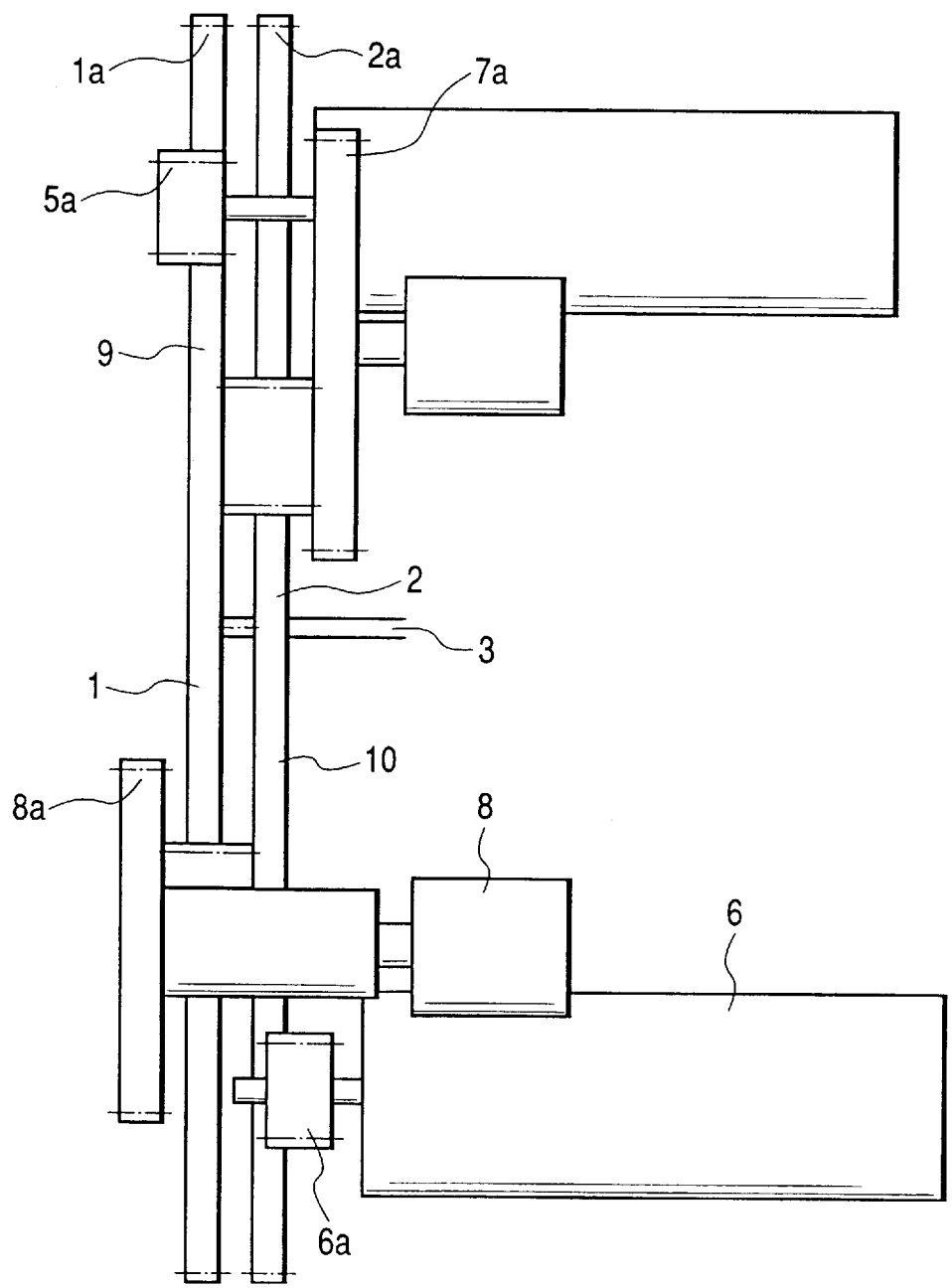
FIG. 9 is a side elevation view showing the mechanical construction of the filter disk apparatus.
Figure 10:
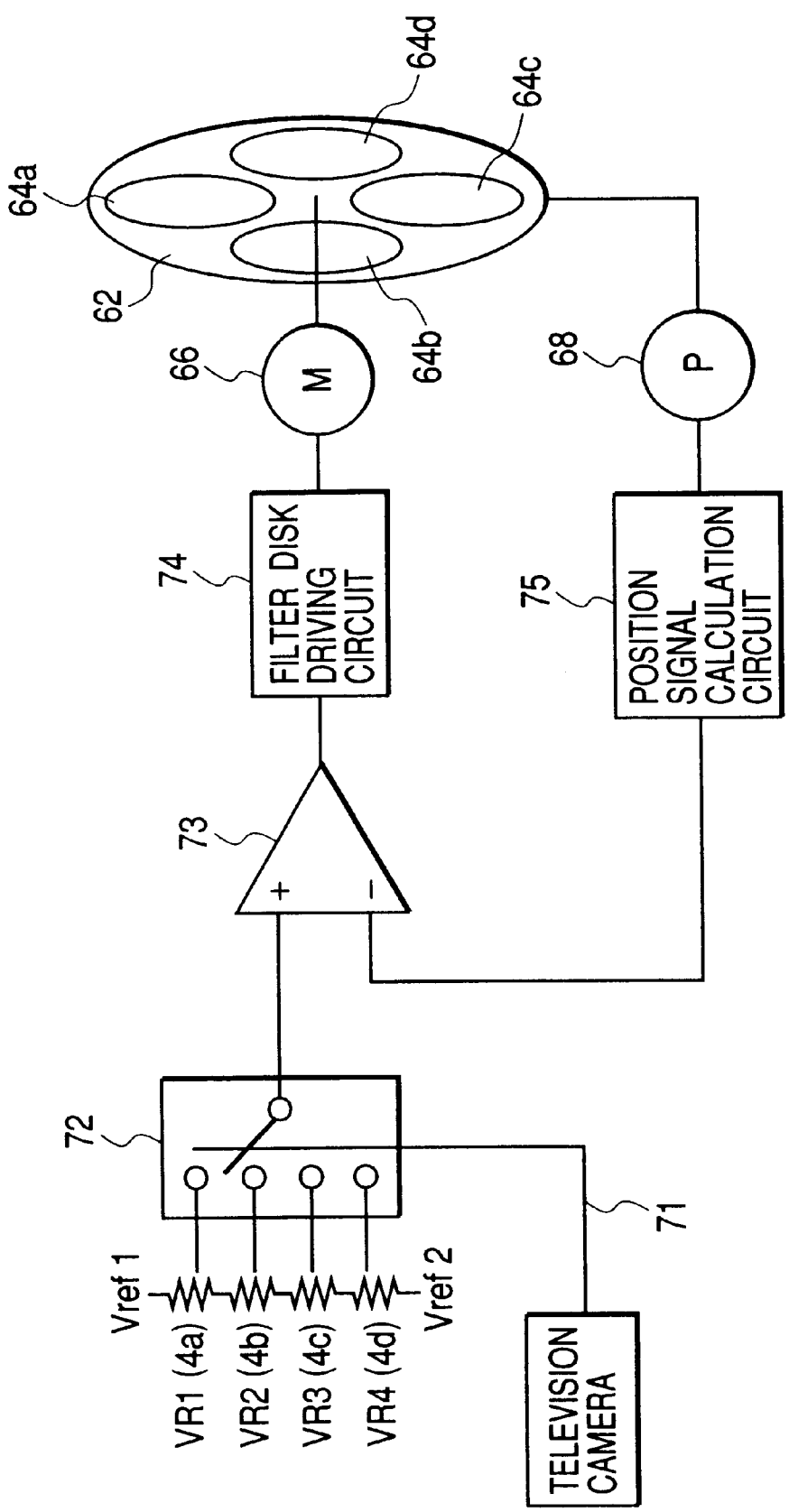
FIG. 10 is a block diagram of a main portion of an electric circuit of a conventional filter disk apparatus.

A mechanical construction of a filter disk apparatus (optical system having a rotating position control apparatus) as a first embodiment of the present invention will now be described with reference to FIGS. 8 and 9. In the filter disk apparatus, two filter disks 1 and 2 are rotatably supported by a shaft 3. Four conversion filters for color temperature (for example, conversion filters for color temperature 4a, 4b, 4c, and 4d in the filter disk 2) are attached at intervals of 90° to each of the filter disks 1 and 2.

Gears 1a and 2a are provided for the peripheries of the filter disks 1 and 2, respectively. Two motors 5 and 6 for driving the filter disks and potentiometers 7 and 8 are arranged on the outsides of the gears 1a and 2a, respectively.

Motor gears 5a and 6a are fixed to output axes of the motors 5 and 6, respectively. The motor gears 5a and 6a are engaged with the gears 1a and 2a, respectively.

Pot gears 7a and 8a are fixed to the axes of the potentiometers 7 and 8, respectively. Between the gears 7a and the gear 1a of the filter disk 1 and between the gear 8a and the gear 2a of the filter disk 2, there are arranged two speed gears 9 and 10 to set each of a gear ratio of the potentiometer 7 to the filter disk 1 and a gear ratio of the potentiometer 8 to the filter disk 2 to 1:1, respectively.

Consequently, when the filter disks 1 and 2 are rotated by the motors 5 and 6, rotating input units (contact elements which will be described hereinlater) of the potentiometers 7 and 8 are rotated as much as the same rotation amount as that of each of the filter disks 1 and 2.

Figure 1:
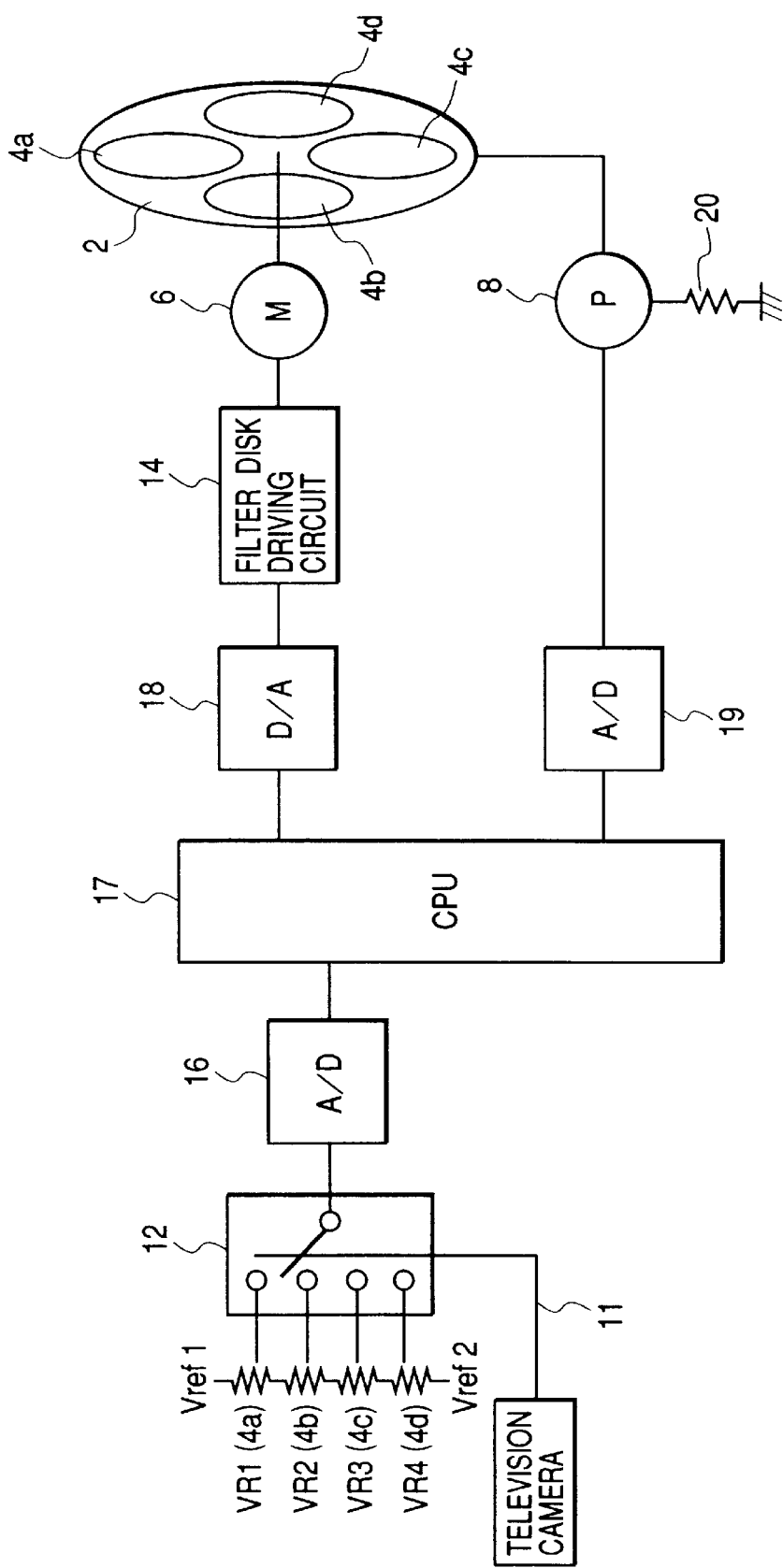
FIG. 1 is a block diagram of a main portion of an electric circuit of a filter disk apparatus in a first embodiment of the present invention.

An electrical construction of the above filter disk apparatus and a television camera system (photographing apparatus) including it will now be described with reference to FIG. 1. Although FIG. 1 shows a driving circuit construction of only the filter disk 2 including the motor 6 and potentiometer 8, a driving circuit construction of the filter disk 1 including the motor 5 and potentiometer 7 is similar to the above construction and, further, a flowchart of the operation of the filter disk 1 is similar to that of the filter disk 2, which will be described hereinafter.

A command signal regarding a target filter position (target rotating position to arrange any one of the filters 4a to 4d on a photographing optical axis) is transmitted from an electric circuit of a television camera via a signal line 11.

In accordance with the command signal transmitted through the signal line 11, a change-over switch 12 selects any one of the resistors VR1 to VR4 to be connected to a CPU 17 via an A/D converter 16.

Each of the resistors VR1 to VR4 outputs a voltage value having the same level as that of a voltage value that is outputted from the potentiometer 8 when each of the filters 4a to 4d is arranged on the photographing optical axis. A voltage signal from the resistor selected from the resistors VR1 to VR4 on the basis of the command signal is A/D converted by the A/D converter 16 and inputted as a digital signal to the CPU 17.

The CPU 17 compares the signal from the A/D converter 16, namely, the digital signal indicative of the target rotating position (hereinbelow, referred to as a commanded position) of the filter disk 2 with a signal from an A/D converter 19, namely, a digital signal indicative of the current rotating position of the filter disk 2 (hereinbelow, referred to as a current position), generates and outputs a digital signal to a D/A converter 18 so as to rotate the filter disk 2 so that the current position coincides with the commanded position.

The D/A converter 18 converts the digital signal transmitted from the CPU 17 into an analog signal and inputs the resultant analog signal to a filter disk driving circuit 14. The filter disk driving circuit 14 drives the motor 6 in accordance with the inputted analog signal to rotate the filter disk 2.

A resistor (voltage setting circuit) 20 sets a voltage value in a portion corresponding to an insulator of the potentiometer 8, which will be described hereinlater.

In this instance, the construction of the potentiometer 8 will now be explained with reference to FIG. 2. The potentiometer 8 comprises, a resistive element 101, an insulator 103 which is provided between both the ends of the resistive element 101, and a contact element (for example, a wiper brush) 102 which rotates in an interlocking relation with the rotation of the filter disk 2 as mentioned above while sliding on the resistive element 101 and insulator 103.

Different voltages Vref1 and Vref2 are applied to both the ends of the resistive element 101, respectively. Which of the voltages Vref1 and Vref2 may be higher than the other one.

A portion to output a voltage (first voltage determined by the voltages Vref1 and Vref2) corresponding to a first filter position (filter position to arrange the filter 4a on the photographing optical axis) from the contact element 102 is set near the end of the resistive element 101. A portion to output a voltage (second voltage) corresponding to a fourth filter position (filter position to arrange the filter 4d on the photographing optical axis) from the contact element 102 is set near the other end of the resistive element 101. In this case, a portion from a position corresponding to the first filter position to the end in the resistive element 101 is referred to as an A portion and a portion from a position corresponding to the fourth filter position to the other end is referred to as a B portion.

On two intermediate positions between both the ends of the resistive element 101, there are set a portion to generate a voltage corresponding to a second filter position. (filter position to arrange the filter 4b on the photographing optical axis) from the contact element 102 and a portion to generate a voltage corresponding to a third filter position (filter position to arrange the filter 4c on the photographing optical axis) from the contact element 102. The voltage corresponding to the third filter position is approximate to the voltage corresponding to the fourth filter position as compared with the voltage corresponding to the second filter position.

One end of the above-mentioned resistor 20 is connected to the insulator 103. The other end of the resistor 20 is connected to the ground (GND) of the present apparatus and the voltage of the insulator 103 is set to a GND level.

Consequently, in the potentiometer 8, when the contact element 102 slides on the resistive element 101, a voltage corresponding to any one of at least the first to fourth filter positions is generated from a position signal output terminal 104 through the contact element 102. When the contact element 102 slides on the insulator 103, a voltage of the GND level is outputted from the position signal output terminal 104 through the contact element 102.

The voltage corresponding to each of the first to fourth filter positions or voltage of the GND level is converted into a digital signal indicative of the current position of the filter disk 2 by the A/D converter 19 and read out by the CPU 17.

Figure 3:
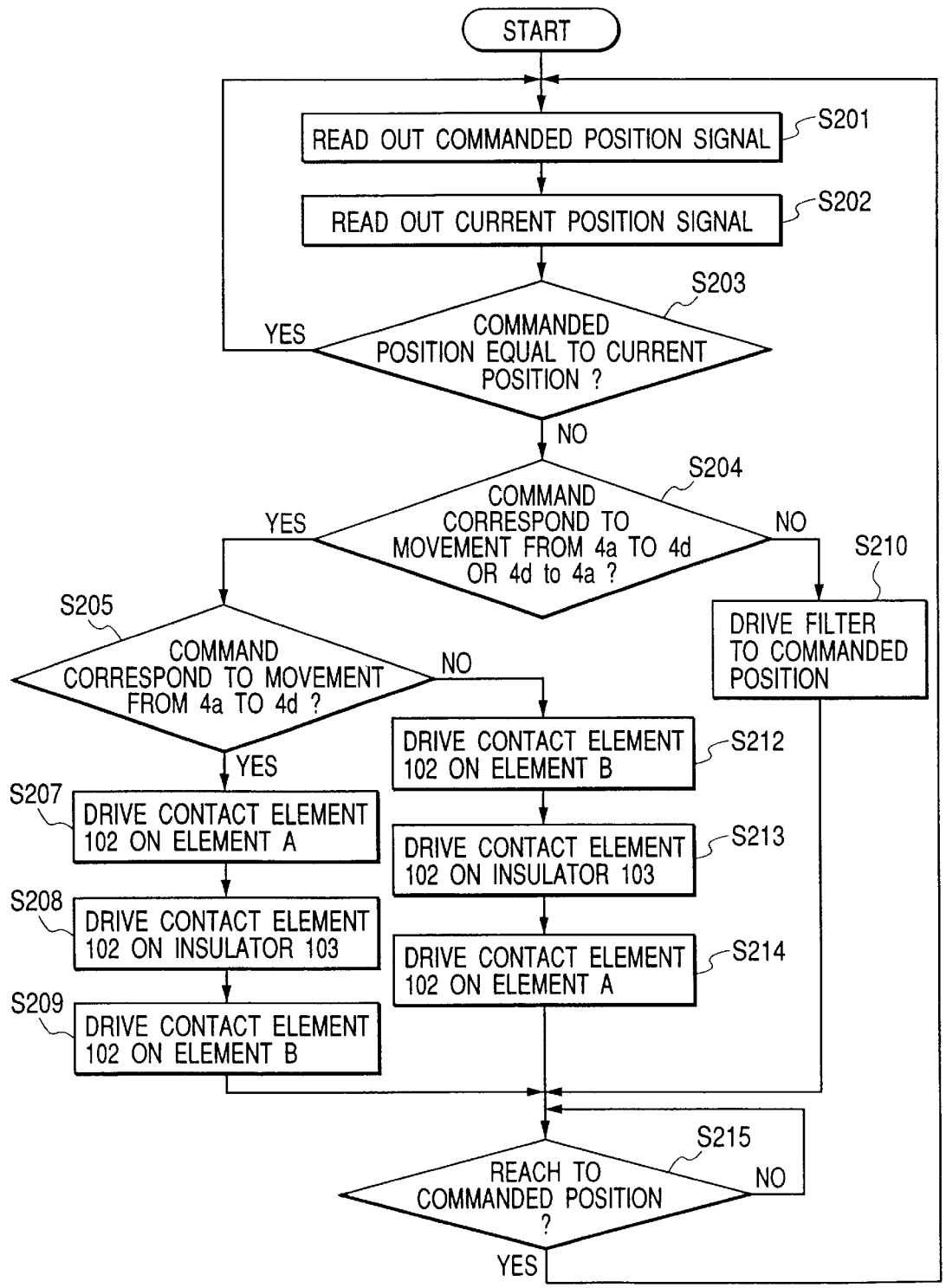
FIG. 3 is a flowchart of an internal process of a CPU in the filter disk apparatus.

A driving control of the filter disk 2 by the CPU 17 will now be explained by referring to a flowchart shown in FIG. 3.

In step S201, a commanded position signal regarding a selection of the filter position is read out from the electric circuit of the television camera through the A/D converter 16. In step S202, a current position signal indicative of the current filter position from the potentiometer 8 is read out through the A/D converter 19.

In step S203, the commanded position is compared with the current position. When the commanded position is equal to the current position, the processing routine is returned to step S201 and is waited until the next commanded position signal is read out. On the other hand, when the commanded position is different from the current position, step S204 follows.

In step S204, it is decided whether the relation between the current position and the commanded position corresponds to that between the first filter position 4a and the fourth filter position 4d or that between the fourth filter position 4d and the first filter position 4a or not. If YES, step S205 follows. If NO, step S210 follows.

In step S210, the motor 6 is driven so that the filter disk 2 is moved-to the filter position as a commanded position. In step S215, when it is decided on the basis of the output of the potentiometer 8 that the filter disk 2 reached the commanded position, driving the motor 6 is stopped and the processing routine is returned to step S201 and waited until the next commanded position signal is inputted.

On the other hand, in step S205, it is decided whether the relation between the current position and the commanded position corresponds to that between the first filter position 4a and the fourth filter position 4d or not. If YES, the processing routine advances to steps S207 to S209. While the output of the potentiometer 8 is monitored, the driving (direction and driving amount) of the motor 6 is controlled so that the contact element 102 is first moved on the A portion from the position corresponding to the first filter position on the resistive element 101, subsequently moved on the insulator 103, and further moved to the position corresponding to the fourth filter position through the B portion of the resistive element 101. In step S215, when it is decided on the basis of the output of the potentiometer 8 that the filter disk 2 reached the commanded position, driving the motor 6 is stopped and the processing routine is returned to step S201 and waited until the next commanded position signal is inputted.

In step S205, when the relation between the current position and the commanded position corresponds to that between the fourth filter position 4d and the first filter position 4a, steps S212 to S214 follow. In this instance, while the output of the potentiometer 8 is monitored, the driving (direction and driving amount) of the motor 6 is controlled so that the contact element 102 is first moved on the B portion from the position corresponding to the fourth filter position on the resistive element 101, subsequently moved on the insulator 103, and further moved on the A portion of the resistive element 101 to reach the position corresponding to the first filter position. When it is decided in step S215 on the basis of the output of the potentiometer 8 that the filter disk 2 reached the commanded position, driving the motor 6 is stopped and the processing routine is returned to step S201 and waited until the next commanded position signal is inputted.

According to the present embodiment, as mentioned above, the potentiometer to detect the current (actual) filter position is constructed so as to enable to generate a detection signal from a range in which the contact element 102 slides on the resistive element 101 serving as its electric operating angle range and a range in which the contact element 102 slides on the insulator 103 which is originally out of the electric operating angle range. When the filter disk 2 is rotated between the first filter position and the fourth filter position, the potentiometer is controlled so that the contact element 102 is rotated on the insulator 103 (while the detection signal to be generated when the contact element 102 slides on the insulator 103 from the end of the resistive element 101 to the other end of the resistive element 101 is monitored).

Therefore, the filter disk 2 can be rotated at a minimum rotating angle between the first filter position and the fourth filter position. That is, the near rotating control can be performed. According to the present embodiment, therefore, the filter disk 2 can always be rotated to the target filter position commanded from the television camera at a minimum rotating angle.

Second Embodiment

According to a second embodiment of the present invention, a calculation is performed by using a command position code regarding the selection of the filter position from the electric circuit of the television camera and a position code as a value obtained by converting the position signal indicative of the current filter position, thereby determining the rotating direction of the filter disk.

Figure 4:
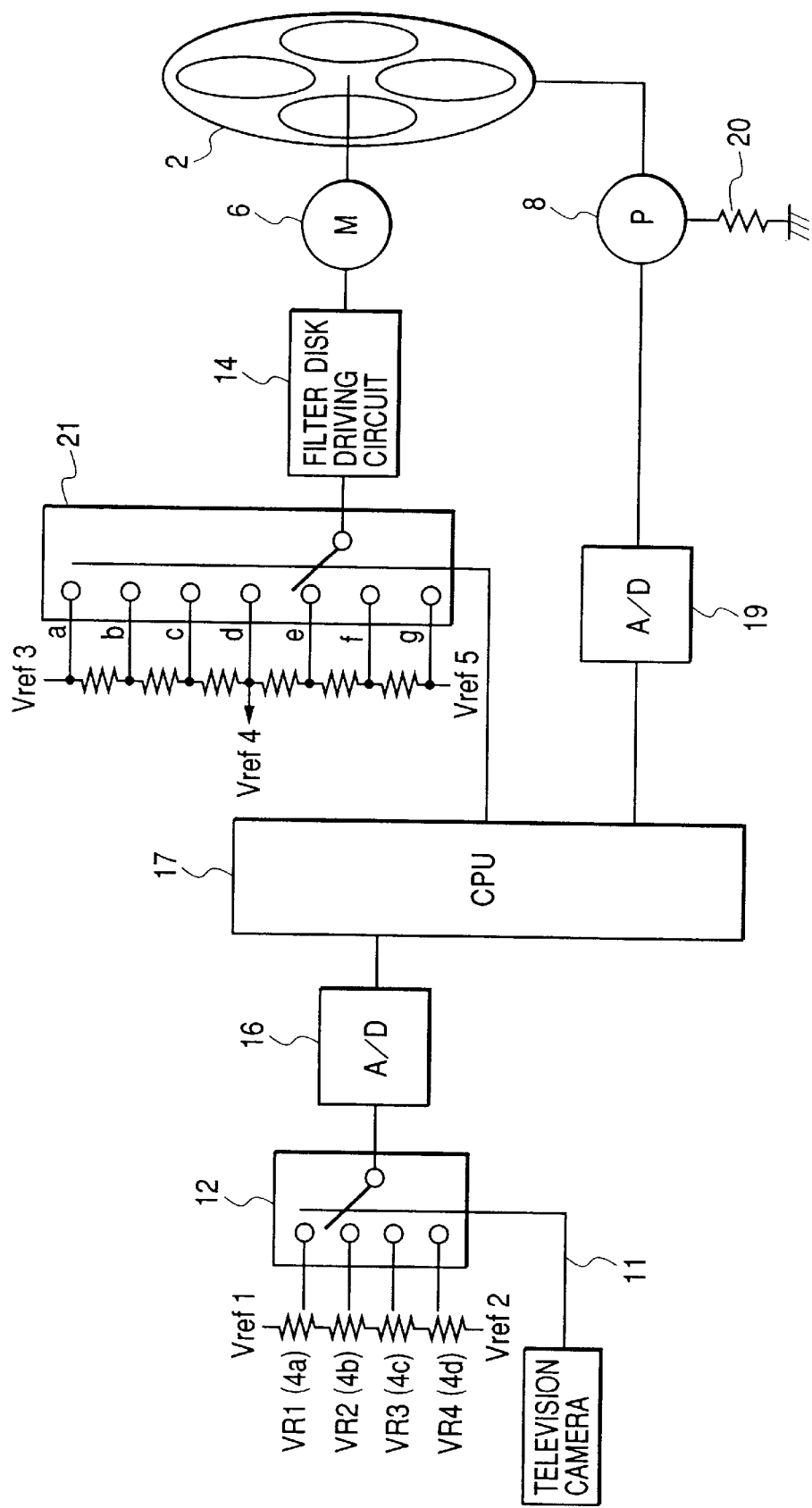
FIG. 4 is a block diagram of a main portion of an electric circuit of a filter disk apparatus in a second embodiment of the present invention.

FIG. 4 shows a construction of a filter disk apparatus for embodying the second embodiment of the present invention, which is used in the television camera. A control signal switching device 21 is included in place of the D/A converter 18 in FIG. 1 used in the first embodiment. The control signal switching device 21 switches the level of a control signal from the CPU 17 to another level.

In the above construction, a command signal regarding the selection of the filter position is inputted from the electric circuit of the television camera to the change-over switch 12 through the signal line 11. The change-over switch 12 switches a command voltage set by each of the resistors VR1 to VR4 so as to correspond to each of the filters 4a to 4d. The command voltage is inputted to the CPU 17 though the A/D converter 16. The potentiometer 8 which is rotated in an interlocking relation with the filter disk 2 is attached to the filter disk 2. In the resistive element portion of the potentiometer 8, a voltage value corresponding to each of respective positions is inputted as a position signal to the A/D converter 19, or in the insulator portion, a voltage value which has a GND level because the resistor 20 is connected to the GND is inputted as a position signal to the A/D converter 19. The inputted signal is converted into a digital signal by the A/D converter 19 and is read out by the CPU 17. The CPU 17 converts a command signal from the A/D converter 16 into a command code, which will be described hereinafter, converts the position signal from the A/D converter 19 into a position code which will be explained hereinafter, and determines the rotating direction by using the command code, position code, and a logical expression which will be explained hereinafter. Further, in order to determine a control signal to be generated to the filter disk driving circuit 14, the CPU 17 determines a control code on the basis of the filter position shown by the command code and the position code obtained by A/D converting the position signal of the current filter position detected by the potentiometer. In this instance, seven levels of "a" to "g" concerning forward rotation, backward rotation, and stopping of the filter disk 2 are set as control codes and correspond to "a" to "g" of the control signal switching device 21. When "a" of the control signal switching device 21 is selected, the filter disk 2 is rotated at the highest speed in the forward direction (rotating direction of 4a→4b→4c→4d), when "b" is selected, the disk 2 is rotated in the forward direction at a speed that is lower than that in case of "a", when "c" is selected, the disk 2 is rotated in the forward direction at a speed that is lower than that in case of "b", and when "d" is selected, the filter disk 2 is stopped. When "g" of the control signal switching device 21 is selected, the filter disk 2 is rotated at the highest speed in the backward direction (rotating direction of 4d→4c→4b→4a), when "f" is selected, it is rotated in the backward direction at a speed that is lower than that in case of "g", and when "e" is selected, it is rotated in the backward direction at a speed that is lower than that in case of "f". After that, the rotation is controlled so that the control codes "a" to "g" are made to correspond to "a" to "g" of the control signal switching device 21, respectively, until the filter disk 2 is moved to the filter position designated by the command code. The control signal generated from the control signal switching device 21 allows the motor 6 to be driven through the filter disk driving circuit 14, thereby rotating the filter disk 2.

Figure 2:
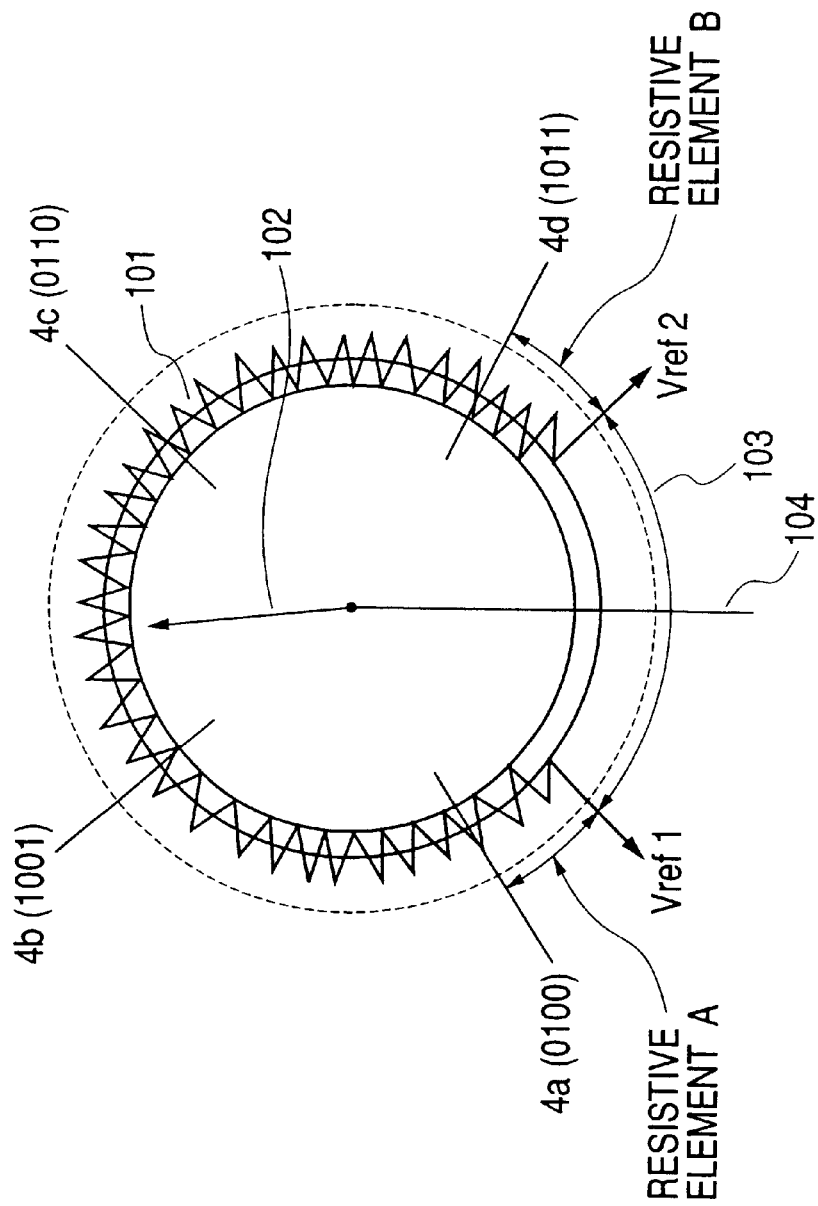
FIG. 2 is an internal constructional diagram of a potentiometer.

Referring to the detail block diagram of the potentiometer in FIG. 2, the codes corresponding to the respective positions are allocated to the filter positions 4a to 4d. That is, binary codes of 0100, 1001, 0110, and 1011 are allocated to the positions 4a, 4b, 4c, and 4d, respectively. In the CPU 17, the codes are made to correspond to the filter positions as command codes and position codes.

Figure 5:
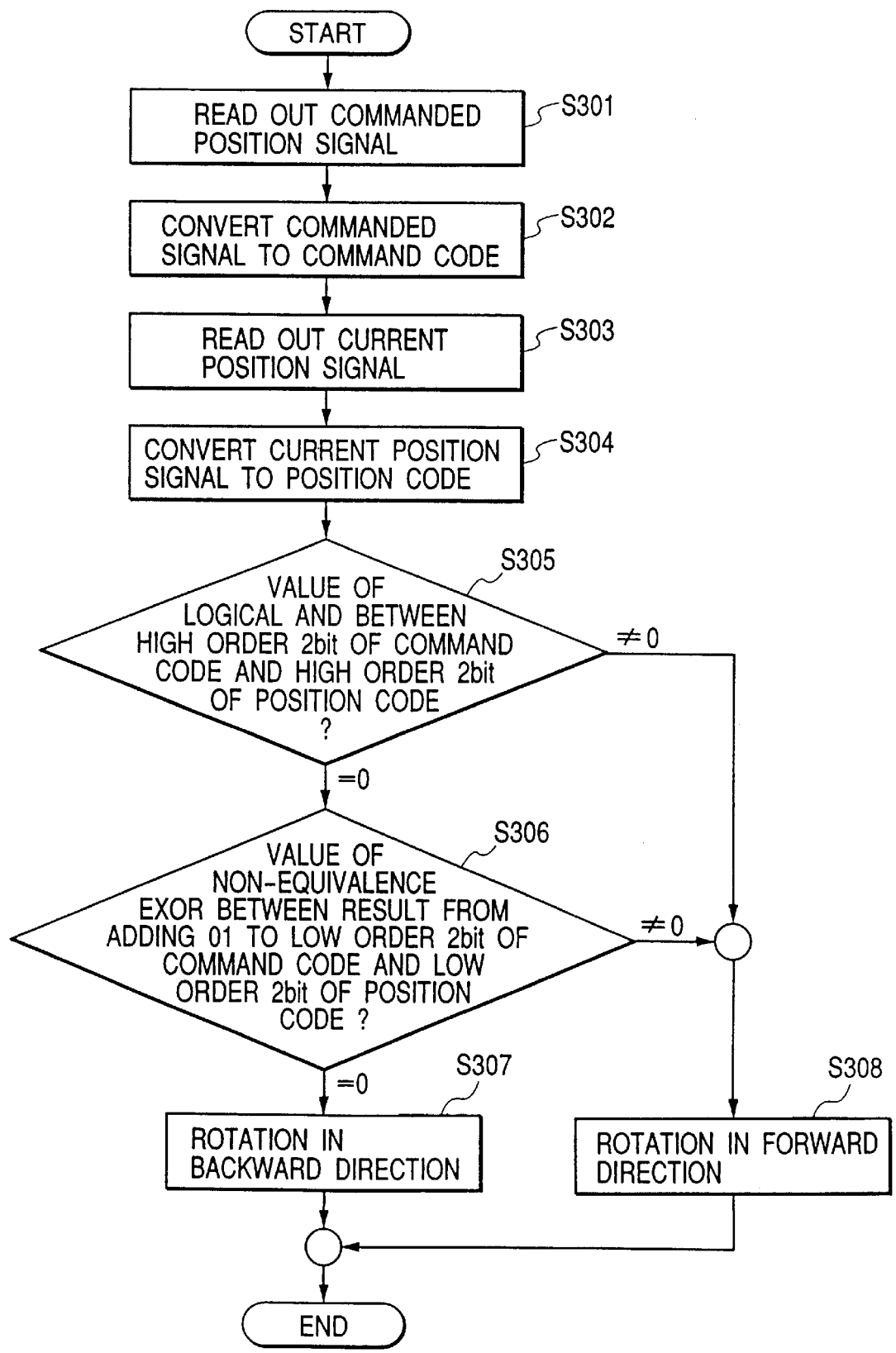
FIG. 5 is a flowchart of a method of determining a rotating direction of a filter disk in the second embodiment of the present invention.

A method of determining the rotating direction of the filter disk 2 by using the logical expression on the basis of the command code obtained by converting the command signal from the A/D converter 16 and the position code obtained by converting the position signal from the A/D converter 19 in the CPU 17 will now be described with reference to a flowchart shown in FIG. 5.

A command signal regarding the selection of the filter position from the electric circuit of the television camera is read out through the A/D converter 16 (S301) and is converted into a binary command code (4a=0100, 4b=1001, 4c=0110, and 4d=1011) corresponding to the command signal (S302). Subsequently, a position signal indicative of the current filter position is read out through the A/D converter 19 (S303) and is converted into a binary position code (4a=0100, 4b=1001, 4c=0110, and 4d=1011) corresponding to the position signal (S304). A value of logical AND is obtained between high order 2 bit of the command code and high order 2 bit of the position code (S305). When the resultant value is not equal to 0, the rotating direction is determined to the forward direction (S308). When it is equal to 0, a value of non-equivalence EXOR is obtained between a value obtained by adding 01 to low order 2 bit of the command code and low order 2 bit of the position code (S306). When the resultant value is not equal to 0, the rotating direction is determined to the backward direction (S307). When it is equal to 0, the rotating direction is determined to the forward direction (S308).

In this instance, the determination of the rotating direction at the time of the movement from 4d to 4c and the movement from 4c to 4a will be specifically explained.

The movement from 4d to 4c will now be explained. The code 0110 of 4c indicates the command code and the code 1011 of 4d denotes the position code. Therefore, when a value of the logical AND is obtained between 01 of high order 2 bit of the command code and 10 of high order 2 bit of the position code, the resultant value is set to 00. Consequently, the processing routine needs to advance to the next procedure (calculation) in order to determined the rotating direction. When a value of the non-equivalence EXOR is obtained between 11 obtained by adding 01 to 10 of low order 2 bit of the command code and 11 of low order 2 bit of the position code, the resultant value is set to 00, so that the rotating direction can be determined to the backward direction.

As for the movement from 4c to 4a, the code 0100 of 4a indicates the command code and the code 0110 of 4c denote the position code. Accordingly, when the value of logical AND is obtained between 01 of high order 2 bit of the command code and 01 of high order 2 bit of the position code, the resultant value is set to 01. Consequently, the rotating direction can be determined to the forward direction.

Although the rotating direction at the time of the movement to the filter position which is not adjacent to the current filter position is set to the forward direction in the present embodiment, it can be also set to the backward direction.

Figure 6:
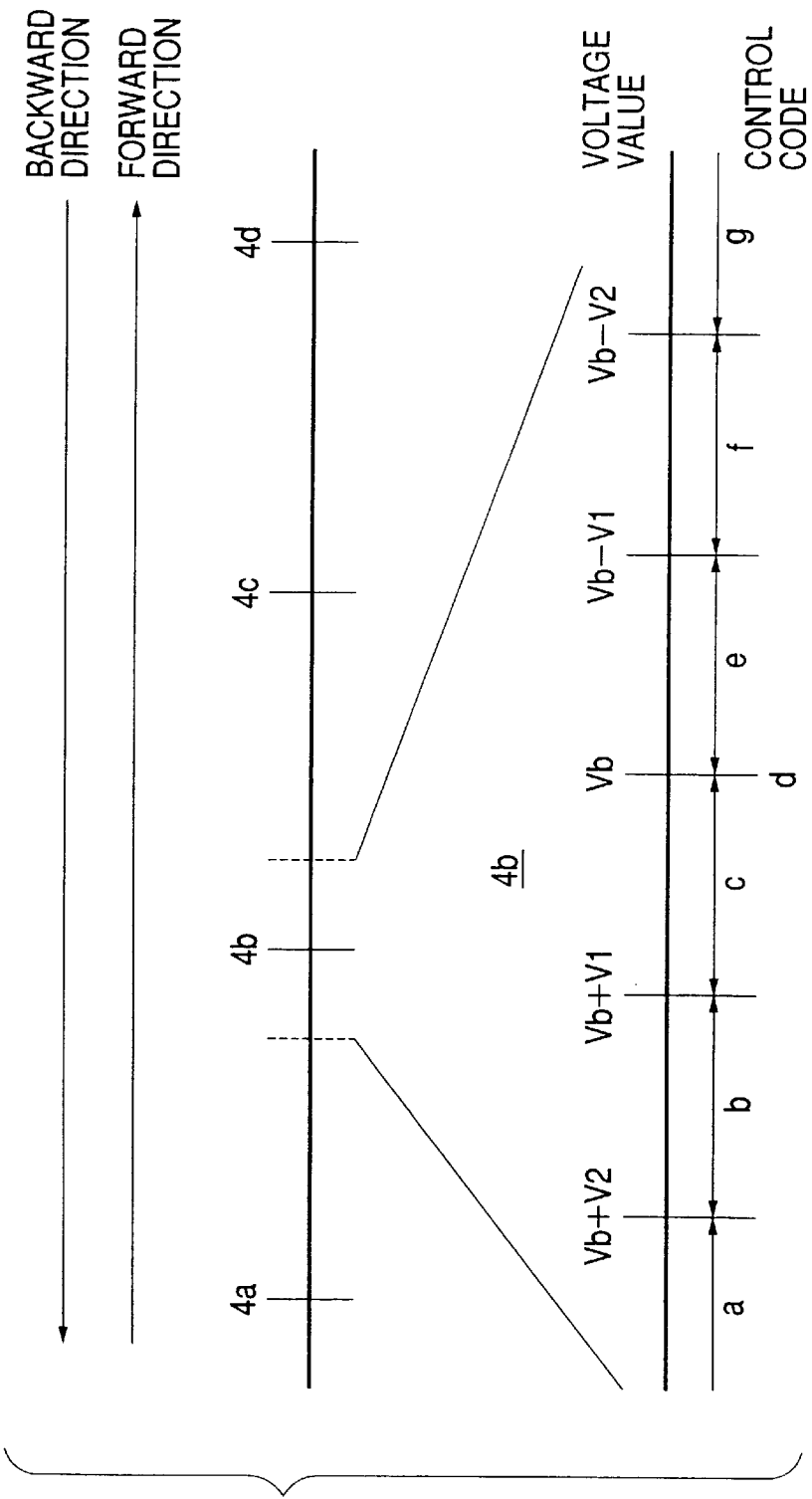
FIG. 6 is a development of the filter disk in the second embodiment of the present invention.

A method of determining the control code on the basis of a difference between the filter position designated by the command code and the filter position shown by the position code based on the output of the potentiometer in the CPU 17 will now be explained. Explanation will be made with respect to a case where the filter is moved to the position 4b will now be described as an example. FIG. 6 shows a development obtained by cutting the portion between the positions 4a and 4d of the filter disk 2 to linearly develop the filter positions on the circumference and further enlarging the portion of the filter position 4b. In this case, it is assumed that the voltage of the position 4b is set to a reference voltage Vb. A voltage value V2 that is smaller than that of each portion located between the neighboring filter positions from 4a to 4d and a voltage value V1 that is further smaller than the value V2 exist. When the position 4b is set to a reference, a position where a voltage is set to Vb+V1 that is higher than the voltage Vb as much as a value of V1 exists on the side close to 4a and, further, a position where a voltage is set to Vb+V2 that is higher than the voltage Vb as much as a value of V2 exists on the side further closer to 4a. When the position 4b is set to a reference, a position where a voltage is set to Vb−V1 that is lower than the voltage Vb as much as a value of V1 exists on the side close to 4c and a position where a voltage is set to Vb−V2 that is lower than the voltage Vb as much as a value of V2 exists on the side further closer to 4c. When the filter disk position is moved from the position 4a to the position 4b, the control code "a" is allocated to a position where a voltage value is higher than the value of Vb+V2, the control code "b" is allocated to a position where a voltage value lies within a range of Vb+V2 to Vb+V1, the control code "c" is allocated to a position where a voltage value lies within a range of Vb+V1 to Vb, and the control code "d" is allocated to a position where a voltage value is equal to Vb, namely, the filter position 4b. When the filter disk position is moved from 4c to 4b, the control code "g" is allocated to a position where a voltage value is lower than the value of Vb−V2, the control code "f" is allocated to a position where a voltage value lies within a range of Vb−V2 to Vb−V1, the control code "e" is allocated to a position where a voltage value lies within a range of Vb−V1 to Vb, and the control code "d" is allocated to a position where a voltage value is equal to Vb, namely, the filter position 4b. When the filter is moved to the position 4c, the voltage at the position 4c is set to a reference voltage Vc and the control codes are allocated in a manner similar to the above. When the filter is moved to the position 4a or 4d, a voltage at a target rotating position is set to a reference voltage in a range where the contact element 102 slides on the resistive element 101 and the control codes are similarly allocated. In this manner, in order to control so that the filter disk 2 is not moved beyond the filter position designated by the command code and surely reaches the filter position, the control to reduce the rotating speed of the filter disk is performed according as the filter disk approaches the filter position designated by the command code.

Figure 7:
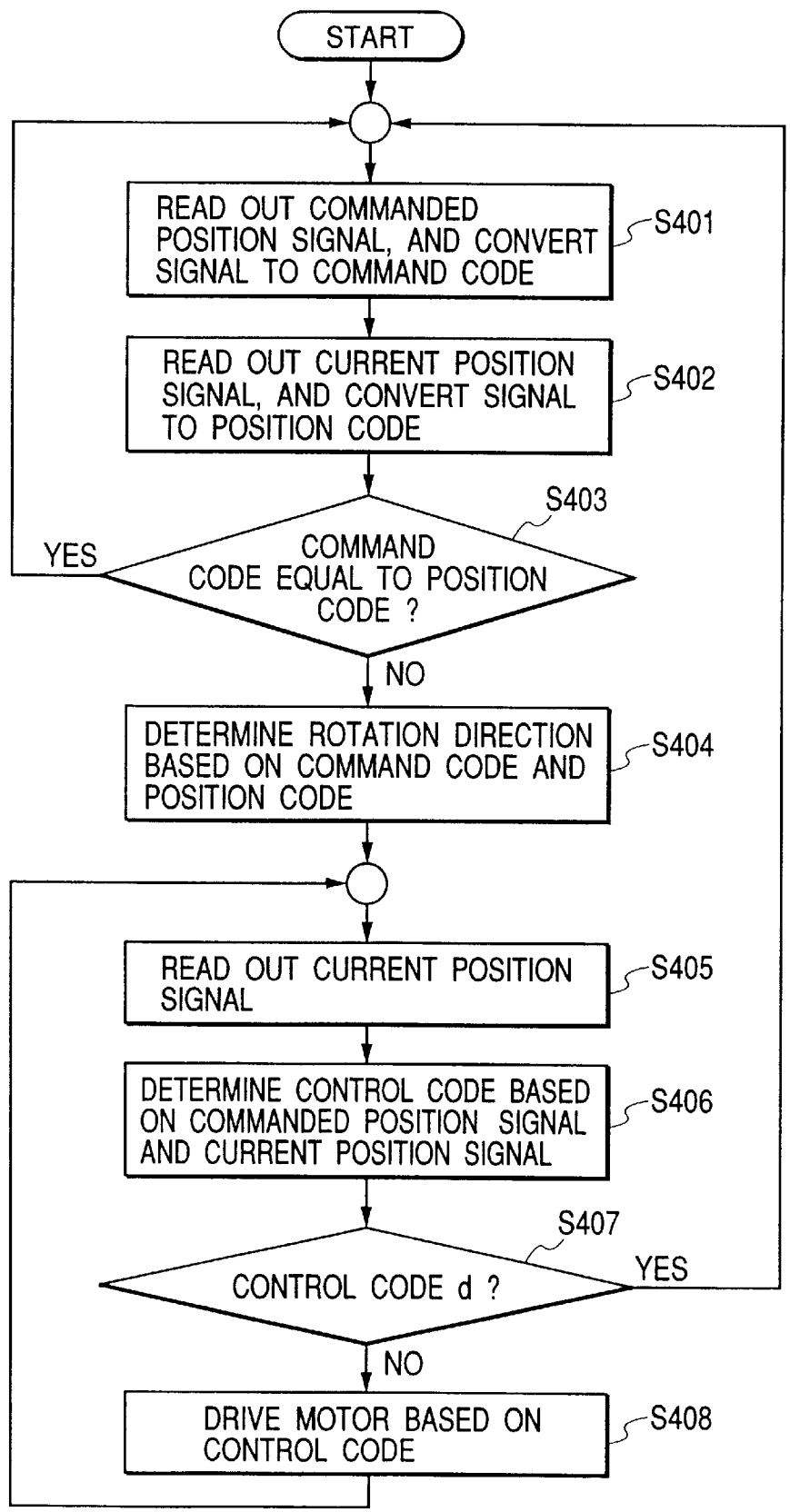
FIG. 7 is a flowchart of an internal process of a CPU at the time of controlling the filter disk.

An internal process of the CPU 17 when the filter disk 2 is controlled will now be described with reference to a flowchart shown in FIG. 7.

First, a command signal regarding the selection of the filter position from the electric circuit of the television camera is read out through the A/D converter 16. The read signal is converted into a binary command code (4a=0100, 4b=1001, 4c=0110, and 4d=1011) corresponding to the command signal (S401). Subsequently, a position signal indicative of the current filter position is read out through the A/D converter 19 and is converted into a binary position code (4a=0100, 4b=1001, 4c=0110, and 4d=1011) corresponding to the position signal (S402). The command code is compared with the position code (S403). When the command code is equal to the position code, the processing routine is returned to step S401. When the command code is different from the position code, the rotating direction is determined on the basis of the command code and position code (S404). After that, the position signal indicative of the current filter position is read out through the A/D converter 19 (S405) and a control code is determined on the basis of the command signal and position signal (S406). Subsequently, whether the control code denotes d or not is decided (S407). If YES, the processing routine is returned to S401. If NO, S408 follows. The motor is driven in accordance with the selected control code and the processing routine is returned to step S405.

As mentioned above, since there are provided such a position detecting device for detecting the position of the resistive element in the electric operating angle range of the potentiometer indicating the current filter position and the position of the insulator out of the electric operating angle range, and the control switching device 21 for controlling so as to minimize the movement from the position detected by the position detecting device to the selected position as a filter position transmitted from the electric circuit of the television camera, even in the filter position control using the potentiometer, the filter disk can be rotated not only in the electrical operational angle range of the potentiometer but also out of the range, so that the near rotating control can be realized.

Third Embodiment

In the second embodiment, the calculation is performed by using the command code obtained by converting the command signal regarding the selection of the filter position from the electric circuit of the television camera and the position code as a value obtained by converting the position signal indicative of the current filter position, thereby determining the rotating direction of the filter disk. The rotating direction can also be determined by using a table between the command code and the position code. A method of determining the rotating direction by using the table between the command code and the position code will now be described hereinbelow.

Since the construction of the filter disk apparatus for embodying a third embodiment of the present invention, which is used in the television camera, is similar to that of the second embodiment, the third embodiment will now be described hereinbelow with reference to FIG. 4.

In the construction shown in FIG. 4, a command signal regarding the selection of the filter position is inputted from the electric circuit of the television camera to the change-over switch 12 via the signal line 11. The change-over switch 12 switches a command voltage set by each of the resistors VR1 to VR4 so as to correspond to each of the filters 4a to 4d and the command voltage is inputted to the CPU 17 through the A/D converter 16. The potentiometer 8 which is rotated in an interlocking relation with the filter disk 2 is attached to the filter disk 2. In the resistive element portion of the potentiometer 8, a voltage value which corresponds to each of respective positions is inputted as a position signal to the A/D converter 19, or in the insulator element portion, a voltage value which has a GND level because the resistor 20 is connected to the GND is inputted as a position signal to the A/D converter 19. The signal is then converted into a digital signal. The resultant signal is read out by the CPU 17. The CPU 17 converts the command signal from the A/D converter 16 into a command table code which will be explained hereinafter and converts the position signal from the A/D converter 19 into a position table code which will be described hereinafter, and determines the rotating direction by using a rotating direction table which will be described hereinlater on the basis of the command table code and the position table code.

According to the present embodiment, the command table codes and position table codes corresponding to the respective positions are allocated to the filter positions 4a to 4d. That is, as command table codes, a code "1" is allocated to the position 4a, "2" is allocated to 4b, "3" is allocated to 4c, and "4" is allocated to 4d. As position table codes, a code "a" is allocated to the position 4a, "b" is allocated to 4b, "c" is allocated to 4c, and "d" is allocated to 4d. In the CPU 17, as command table codes and position table codes, those codes are made to correspond to the filter positions.

The rotating direction tale has the command table codes 1 to 4 in the longitudinal direction and the position table codes a to d in the lateral direction. The rotating direction is determined on the basis of the combination of the table codes in the longitudinal and lateral directions. For example, when the filter position shown by the command of the television camera denotes 4a and the current filter position indicates 4c, the command table code is set to 1 and the position table code is set to c, so that the rotating direction is determined to: the forward direction. When the filter position shown by the command of the television camera denotes 4d and the current filter position denotes 4c, the command table code indicates 4 and the position table code indicates c, so that the rotating direction is determined to the backward direction.

Subsequently, a method of determining the rotating direction of the filter disk 2 by using the rotating direction table on the basis of the command table code converted from the command signal from the A/D converter 16 and the position table code converted from the position signal from the A/D converter 19 in the CPU 17 will now be described.

First, the command signal regarding the selection of the filter position is read out from the electric circuit of the television camera through the A/D converter 16 to be converted into a command table code (4a=1, 4b=2, 4c=3, or 4d=4) corresponding to the command signal. The position signal indicative of the current filter position is read out through the A/D converter 19 to be converted into a position table code (4a=a, 4b=b, 4c=c, or 4d=d) corresponding to the position signal. The rotating direction is determined on the basis of the command table code and the position table code by the rotating direction table.

According to the present embodiment, in case of the movement from 4a to 4c, the rotating direction at the time of the movement to the filter position that is not adjacent to the current filter position is set to the forward direction. It can also be set to the backward direction.

As mentioned above, since there are provided position detecting means for detecting the position of the resistive element in the electric operating angle range of the potentiometer showing the current filter position and the position of the insulator out of the electric operating angle range, and control means for controlling so as to minimize the movement from the position detected by the position detecting means to the selected position as a filter position transmitted from the electric circuit of the television camera, even in the filter position control using the potentiometer, the filter disk can be rotated not only in the electric operating angle range of the potentiometer but also out of the range, so that the near rotating control can be realized.

What is claimed is:

1. A rotating position control apparatus which has a potentiometer comprising a contact element relatively rotating in accordance with a rotation of a rotary element and a resistive element, detects a position of said rotary element as an output of said potentiometer, compares said position with a target rotating position, and moves said rotary element to at least first to third three positions, comprising:

an insulator which is provided between terminals of said resistive element;

a voltage applying circuit for applying a predetermined voltage to one end of said resistive element, applying another predetermined voltage that is lower than said predetermined voltage to the other end, forming a first voltage as an output of said potentiometer when the position of said rotary element indicates the first position and a third voltage that is lower than the first voltage when it indicates the third position, and forming a voltage that is approximate to the third voltage according as it is moved from the first position to the third position, wherein when the third position is commanded as a target rotating position in the case where said rotary element is positioned on the first position, said contact element is moved so as to pass one end of said resistive element and said insulator to the other end; and an A/D converting unit for A/D converting the output of said potentiometer, wherein the direction to drive the rotation of said rotary element from a current rotating position to a target rotating position is determined by performing a logical calculation on the basis of a value obtained by A/D converting the output of said potentiometer though said A/D converting unit and a command code to instruct the target rotating position of the rotary element.

2. A rotating position control apparatus which has a potentiometer comprising a contact element relatively rotating in accordance with a rotation of a rotary element and a resistive element, detects a position of said rotary element as an output of said potentiometer, compares said position with a target rotating position, and moves said rotary element to at least first to third three positions, including:

an insulator which is provided between terminals of said resistive element;

a voltage applying circuit for applying a predetermined voltage to one end of said resistive element, applying another predetermined voltage that is lower than said predetermined voltage to the other end, forming a first voltage as an output of said potentiometer when the position of said rotary element indicates the first position and a third voltage that is lower than the first voltage when it indicates the third position, and forming a voltage that is approximate to the third voltage according as it is moved from the first position to the third position, wherein when the first position is commanded as a target rotating position in the case where said rotary element is positioned on the third position, said contact element is moved to the one end of said resistive element so as to pass the other end and said insulator, and an A/D converting unit for A/D converting the output of said potentiometer, wherein the direction to drive the rotation of said rotary element from a current rotating position to a target rotating position is determined by performing a logical calculation on the basis of a value obtained by A/D converting the output of said potentiometer though said A/D converting unit and a command code to instruct the target rotating position of the rotary element.

3. A rotating position control apparatus which has a potentiometer comprising a contact element rotating in accordance with a rotation of a rotary element and a resistive element on which said contact element slides, and a control unit for driving the rotation of said rotary element to a plurality of rotating positions on the basis of an output of said potentiometer, comprising an A/D converting unit for A/D converting the output of said potentiometer, wherein the direction to drive the rotation of said rotary element from a current rotating position to a target rotating position at a minimum rotation amount is determined by performing a logical calculation on the basis of a value obtained by A/D converting the output of said potentiometer through said A/D converting unit and a command code to instruct the target rotating position of the rotary element.

4. A rotating position control apparatus which has a potentiometer comprising a contact element rotating in accordance with a rotation of a rotary element and a resistive element on which said contact element slides, detects a position of said rotary element as an output of said potentiometer, compares the position with a target rotating position as a position to which said rotary element is moved, and moves said rotary element to at least three predetermined positions, comprising:

an A/D converting unit for A/D converting the output of said potentiometer; and a control unit for setting a predetermined control code to control the rotation of said rotary element for each of rotating areas divided in a plurality of predetermined ranges on the basis of the target rotating position, wherein said control unit control the rotation of said rotary element on the basis of the current position of said rotary element, which is shown by an A/D conversion value through said A/D converting unit, and said control code.

5. The apparatus according to claim 4, wherein said control unit determines a rotating direction of said rotary element on the basis of said control code.

6. The apparatus according to claim 4, wherein said control unit determines a rotating speed of said rotary element on the basis of said control code.

7. The apparatus according to claim 6, wherein at a time of a driving of the rotation on the basis of the control code, said control unit controls the rotating speed of said rotary element so as to be slower as the position of said rotary element is closer to the target rotating position.

8. The apparatus according to claim 4, further comprising:

a selecting unit for selecting the control code on the basis of the current position of said rotary element shown by an A/D conversion value through said A/D converting unit; and a control signal switching device for switching a control signal to rotate said rotary element in correspondence to the control code selected by said selecting unit.

9. The apparatus according to claim 8, wherein as said rotary element is closer to the target rotating position, said control signal switching device selects the control signal in which the level of a voltage signal is smaller.

10. The apparatus according to claim 4, wherein said control unit decides on the basis of the control code that said rotary element reached the target rotating position.

11. The apparatus according to claim 4, wherein said rotating position control apparatus drives the rotation of said rotary element from the current rotating position to the target rotating position at a minimum rotation amount.

12. A rotating position control apparatus which has a potentiometer comprising a contact element rotating in accordance with a rotation of a rotary element and a resistive element on which said contact element slides, detects the position of said rotary element as an output of the potentiometer, compares said position with a target rotating position as a position to which the rotary element is moved, and moves said rotary element to at least three predetermined positions, comprising:

an A/D converting unit for A/D converting the output of said potentiometer; and a control unit for allowing said A/D converting unit to A/D convert a detection value of the rotary element detected by said potentiometer to set a resultant value as a position table code, and setting the target rotating position of said rotary element as a command table code, wherein said control unit drives the rotation of said rotary element in a predetermined rotating direction in which a minimum rotation amount is derived on the basis of the combination of said position table code and said command table code.

13. A rotating position control apparatus which has a potentiometer comprising a contact element rotating in accordance with a rotation of a rotary element and a resistive element on which said contact element slides, and a control unit for driving the rotation of said rotary element to at least three predetermined positions on the basis of an output of said potentiometer, comprising an A/D converting unit for A/D converting the output of said potentiometer, wherein the direction to drive the rotation of said rotary element from a current rotating position to a target rotating position at a minimum rotation amount is determined by performing a logical calculation on the basis of a value obtained by A/D converting the output of said potentiometer through said A/D converting unit and a command code to instruct the target rotating position of the rotary element.

14. A rotating position control apparatus which has a potentiometer comprising a contact element relatively rotating in accordance with a rotation of a rotary element and a resistive element, detects a position of said rotary element as an output of said potentiometer, compares said position with a target rotating position, and moves said rotary element to at least first to third three positions, comprising:

an insulator which is provided between terminals of said resistive element;

a voltage applying circuit for applying a predetermined voltage to one end of said resistive element, applying another predetermined voltage that is lower than said predetermined voltage to the other end, forming a first voltage as an output of said potentiometer when the position of said rotary element indicates the first position and a third voltage that is lower than the first voltage when it indicates the third position, and forming a voltage that is approximate to the third voltage according as it is moved from the first position to the third position, wherein when the third position is commanded as a target rotating position in the case where said rotary element is positioned on the first position, said contact element is moved so as to pass one end of said resistive element and said insulator to the other end; and an A/D converting unit for A/D converting the output of said potentiometer, and a control unit for allowing said A/D converting unit to A/D convert a detection value of the rotary element detected by said potentiometer to set a resultant value as a position table code, and setting the target rotating position of said rotary element as a command table code, wherein said control unit drive the rotation of the rotary element in a predetermined rotating direction in which a rotation amount is derived on the basis of the combination of said position table code and said command table code.

15. A rotating position control apparatus which has a potentiometer comprising a contact element relatively rotating in accordance with a rotation of a rotary element and a resistive element, detects a position of said rotary element as an output of said potentiometer, compares said position with a target rotating position, and moves said rotary element to at least first to third three positions, including:

an insulator which is provided between terminals of said resistive element;

a voltage applying circuit for applying a predetermined voltage to one end of said resistive element, applying another predetermined voltage that is lower than said predetermined voltage to the other end, forming a first voltage as an output of said potentiometer when the position of said rotary element indicates the first position and a third voltage that is lower than the first voltage when it indicates the third position, and forming a voltage that is approximate to the third voltage according as it is moved from the first position to the third position, wherein when the first position is commanded as a target rotating position in the case where said rotary element is positioned on the third position, said contact element is moved to the one end of said resistive element so as to pass the other end and said insulator, and an A/D converting unit for A/D converting the output of said potentiometer, and a control unit for allowing said A/D converting unit to A/D convert a detection value of the rotary element detected by said potentiometer to set a resultant value as a position table code, and setting the target rotating position of said rotary element as a command table code, wherein said control unit drive the rotation of the rotary element in a predetermined rotating direction in which a rotation amount is derived on the basis of the combination of said position table code and said command table code.

16. A photographing apparatus comprising the rotating position control according to any one of claims 3, 4, 12, 13, 14 or 15.

* * * * *

UNITED STATES PATENT AND TRADEMARK OFFICE
CERTIFICATE OF CORRECTION

PATENT NO. : 6,605,916 B1
DATED : August 12, 2003
INVENTOR(S) : Kazumasa Yoshikawa It is certified that error appears in the above-identified patent and that said Letters Patent is hereby corrected as shown below:

<u>Title page, Item [54] and Column 1, lines 1-3,</u>
Title, "ROTATION POSITION CONTROL APPARATUS OF ROTARY ELEMENT OF FILTER" should read -- ROTATING POSITION CONTROL APPARATUS OF ROTARY ELEMENT OF FILTER --

<u>Column 16,</u>
Line 39, "claims 3, 4, 12, 13," should read -- claims 1, 2, 3, 4, 12, 13, --

Signed and Sealed this

Second Day of March, 2004

JON W. DUDAS
*Acting Director of the United States Patent and Trademark Office*